United States Patent
Xavier et al.

(10) Patent No.: US 10,426,098 B2
(45) Date of Patent: Oct. 1, 2019

(54) REMOTE-CONTROLLED ROBOTIC EQUIPMENT FOR TREE PRUNING NEAR ENERGIZED POWER LINES

(71) Applicants: LACTEC—INSTITUTO DE TECNOLOGIA PARA O DESENVOLVIMENTO, Curitiba (BR); FEERGS—FERRAMENTAS E EQUIPAMENTOS ELÉTRICOS LTDA., Novo Hamburgo (BR); COELBA—COMPANHIA DE ELETRICIDADE DO ESTADO DA BAHIA, Salvador (BR)

(72) Inventors: Kátia Cilene Falcão Xavier, Salvador (BR); Mario Antonio Duarte Bonfim, Salvador (BR); Roberto Chagas de Almeida, Salvador (BR); Dailton Pedreira Cerqueira, Salvador (BR); Mariella Mendes Revilla, Salvador (BR); Luciano Cavalcante Siebert, Curitiba (BR); Alexandre Albarello Costa, Curitiba (BR); Eduardo Kazumi Yamakawa, Curitiba (BR); Henry Leonardo López Salamanca, Curitiba (BR); Edemir Luiz Kowalski, Curitiba (BR); José Francisco Bianchi Filho, Curitiba (BR); André Luis Muller da Silva, Porto Alegre (BR); Luis Ricardo Alfaro Gamboa, Curitiba (BR); Ronaldo Antonio Roncolatto, Campinas (BR); Luiz Felipe Ribeiro Barrozo Toledo, Curitiba (BR); Thiago Greboge, Curitiba (BR); Diogo Biasuz Dahlke, Curitiba (BR); Felipe Araújo Teixeira Noronha, Salvador (BR)

(73) Assignees: LACTEC—INSTITUTO DE TECNOLOGIA PARA O DESENVOL VIMENTO, Curitiba, PR (BR); FEERGS—FERRAMENTAS E EQUIPAMENTOS ELÉTRICOS LTDA., Novo Hamburgo, RS (BR); COELBA—COMPANHIA DE ELETRICIDADE DO ESTADO DA BAHIA, Salvador, Bahia (BR)

( * ) Notice: Subject to any disclaimer, the term of this patent is extended or adjusted under 35 U.S.C. 154(b) by 295 days.

(21) Appl. No.: 15/165,825

(22) Filed: May 26, 2016

(65) Prior Publication Data
US 2016/0353669 A1  Dec. 8, 2016

(30) Foreign Application Priority Data

Jun. 1, 2015 (BR) .......................... 10 2015 012722

(51) Int. Cl.
*A01G 23/08* (2006.01)
*A01G 3/08* (2006.01)
(Continued)

(52) U.S. Cl.
CPC ............... *A01G 3/08* (2013.01); *A01G 3/086* (2013.01); *A01G 23/08* (2013.01); *B25J 9/046* (2013.01);
(Continued)

(58) Field of Classification Search
CPC .... A01G 23/08; A01G 23/083; A01G 23/085; A01G 23/091; A01G 23/093; A01G 23/095; A01G 23/097
See application file for complete search history.

(56) References Cited

U.S. PATENT DOCUMENTS

| 3,630,398 A | * | 12/1971 | Cervenak | ............... A01G 23/08 414/731 |
| 6,398,140 B1 | * | 6/2002 | Stieh | ..................... A01G 3/002 241/101.741 |

(Continued)

*Primary Examiner* — Matthew Katcoff
(74) *Attorney, Agent, or Firm* — B. Aaron Schulman, Esq.; Stites & Harbison, PLLC

(57) ABSTRACT

A remote-controlled robotic equipment for tree pruning near energized power lines, which, provides a remote-controlled robotic equipment in its own, specific electromechanical structure coupled to a truck and based on a robotic arm with a stand, a positioner, a handler and an end effector-pruning tool, a collection bin and a tree branch shredder, which are all integrated, for robotized tree pruning near energized power lines, which can conveniently, safely and precisely streamline the procedures adopted in the maintenance of
(Continued)

aerial electric power distribution networks, more specifically, tree pruning near urban electric power distribution networks, combined with full ergonomics and no exposure of operators.

2 Claims, 15 Drawing Sheets

(51) Int. Cl.
   *B25J 11/00* (2006.01)
   *B25J 9/04* (2006.01)
   *B25J 18/02* (2006.01)
(52) U.S. Cl.
   CPC ......... *B25J 11/0055* (2013.01); *B25J 18/025* (2013.01)

(56) References Cited

U.S. PATENT DOCUMENTS

| | | | |
|---|---|---|---|
| 6,408,906 B1* | 6/2002 | Moon | A01G 3/08 |
| | | | 144/24.13 |
| 7,882,864 B2* | 2/2011 | Fargeot | A01G 23/095 |
| | | | 144/34.1 |

* cited by examiner

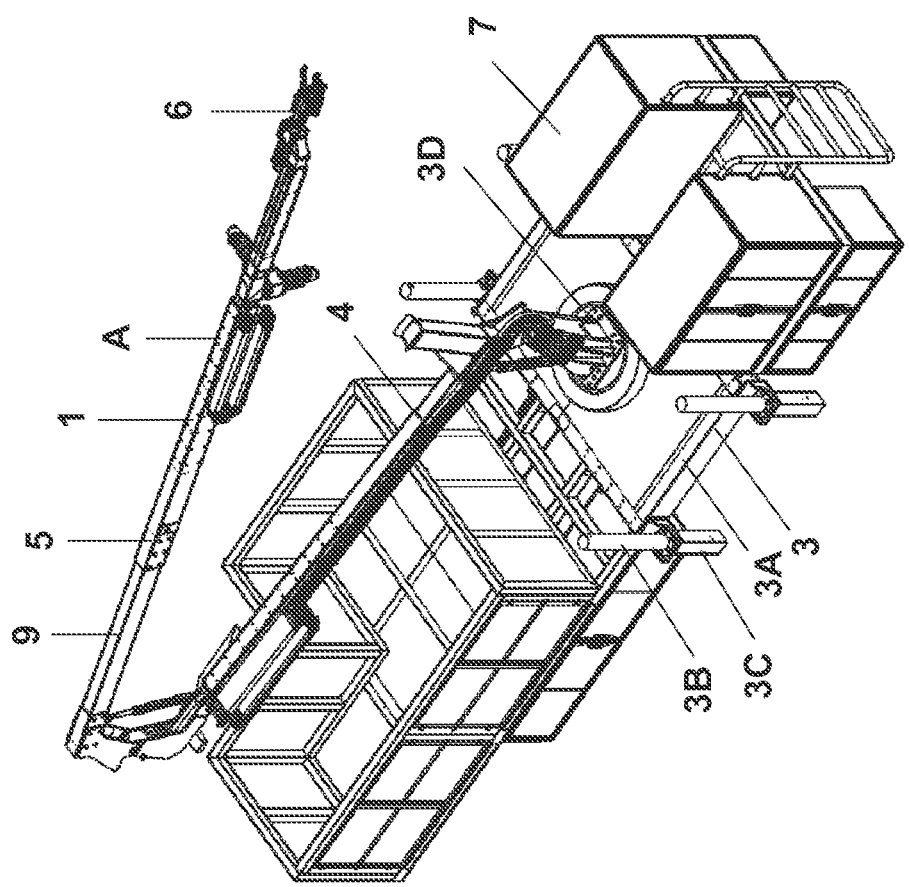

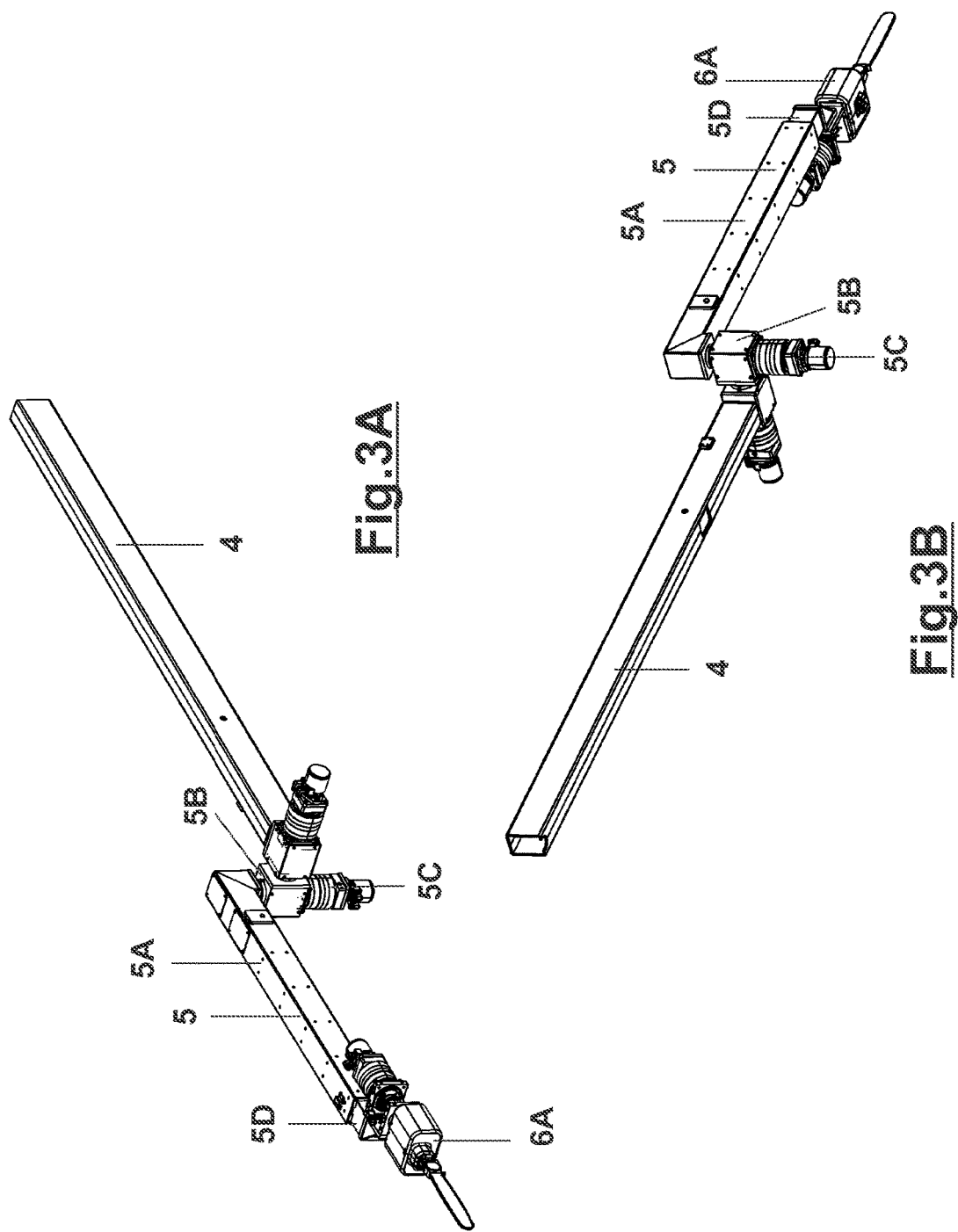

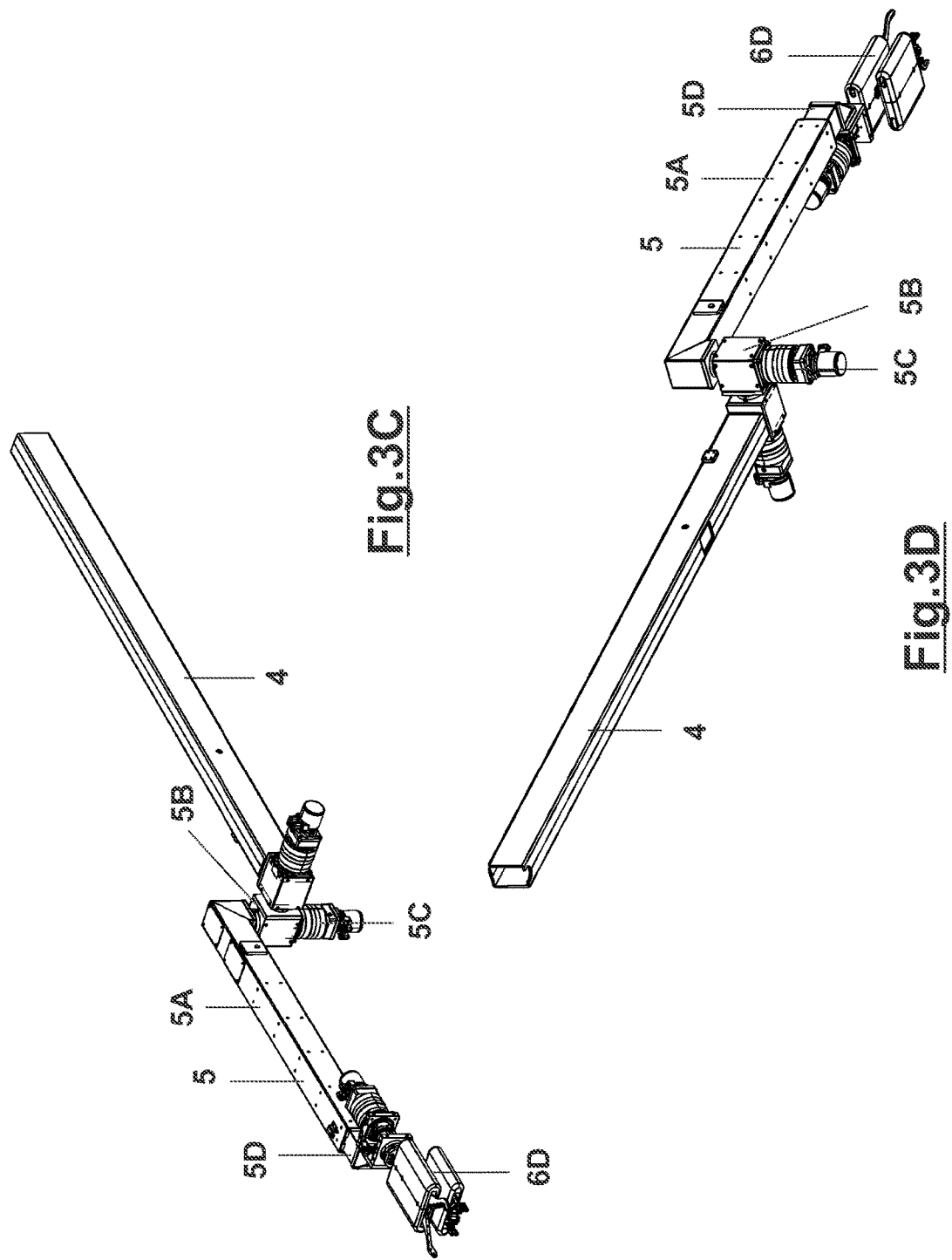

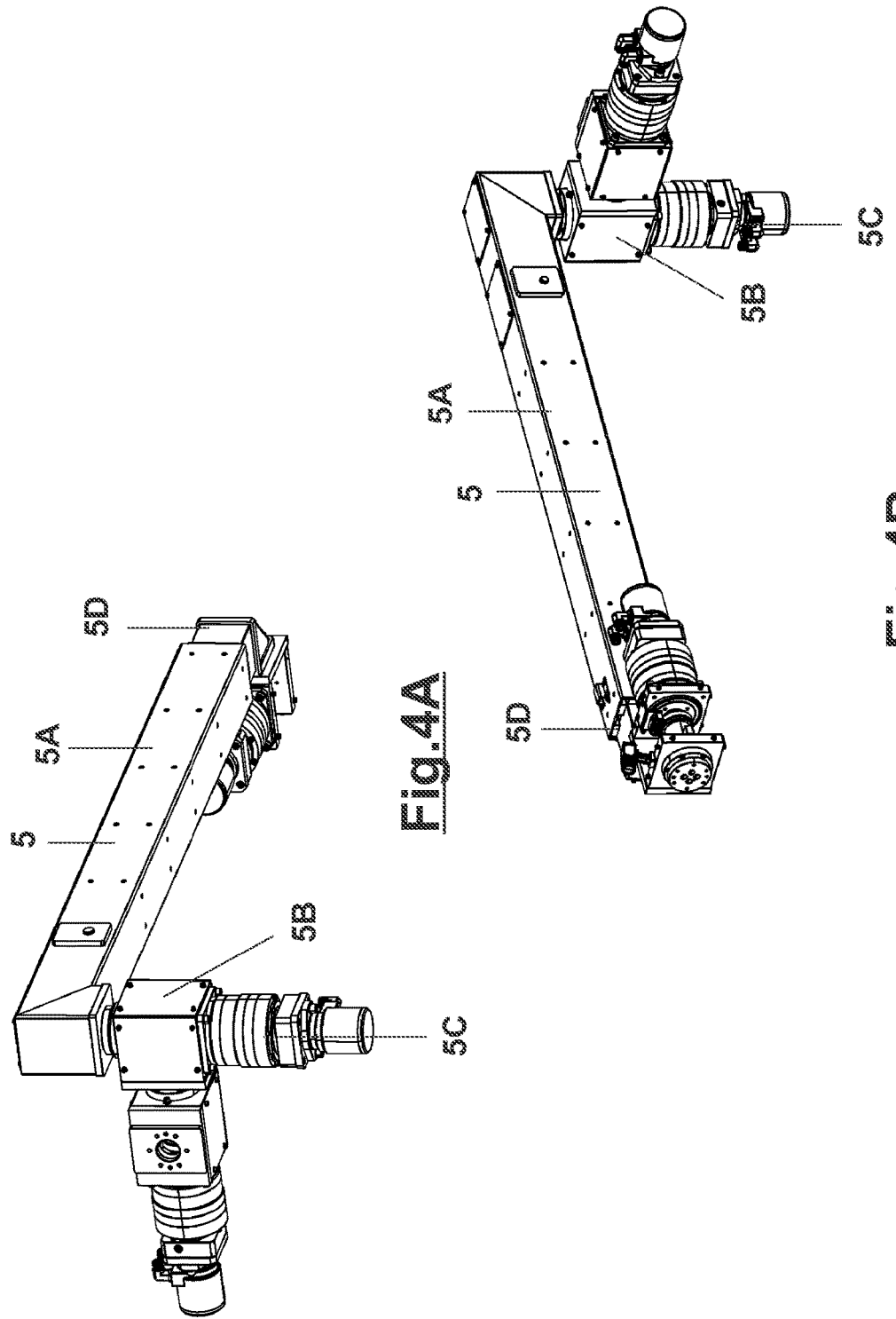

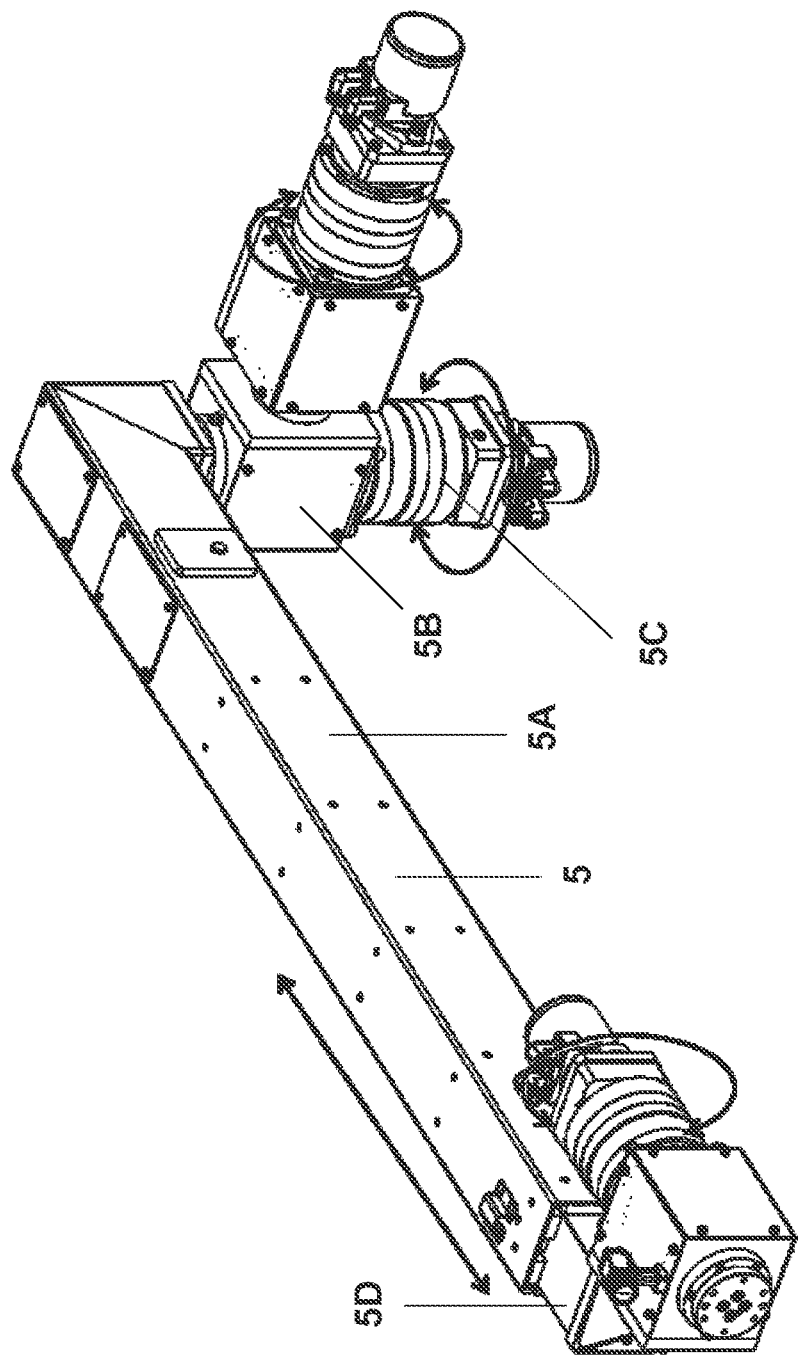

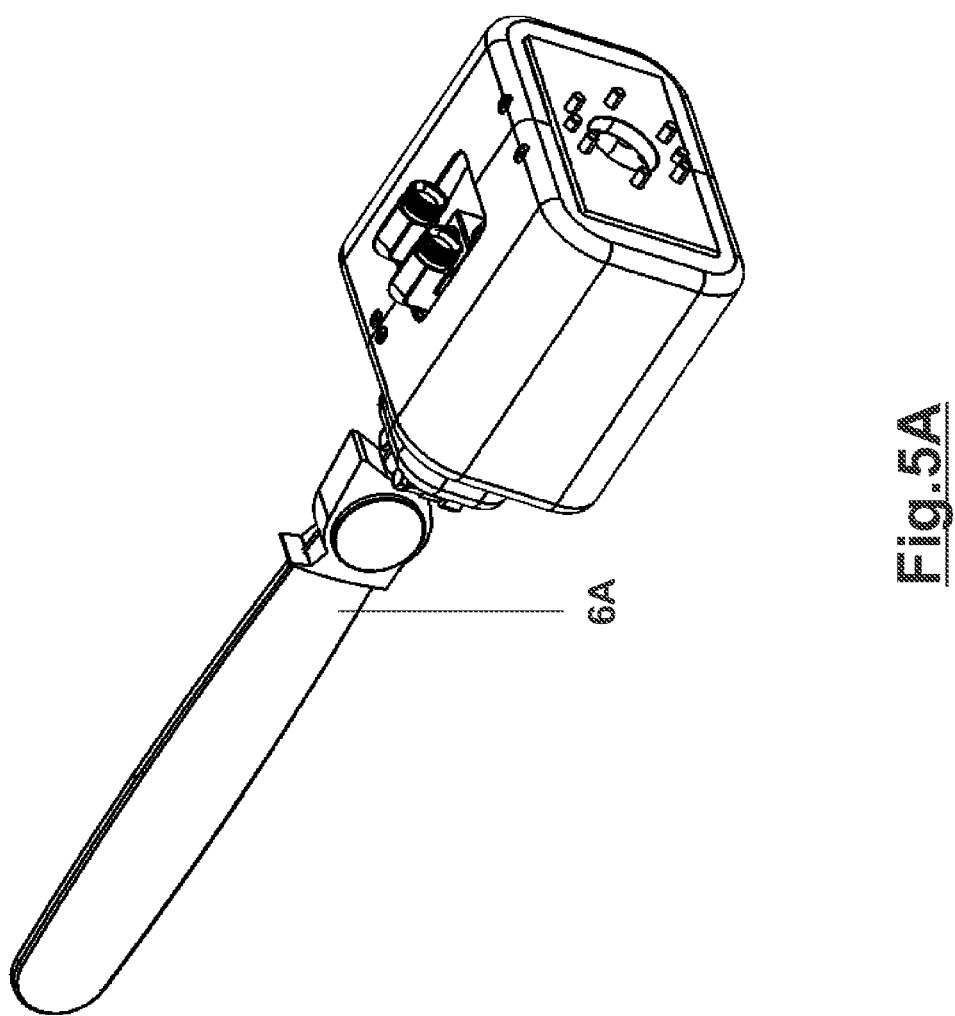

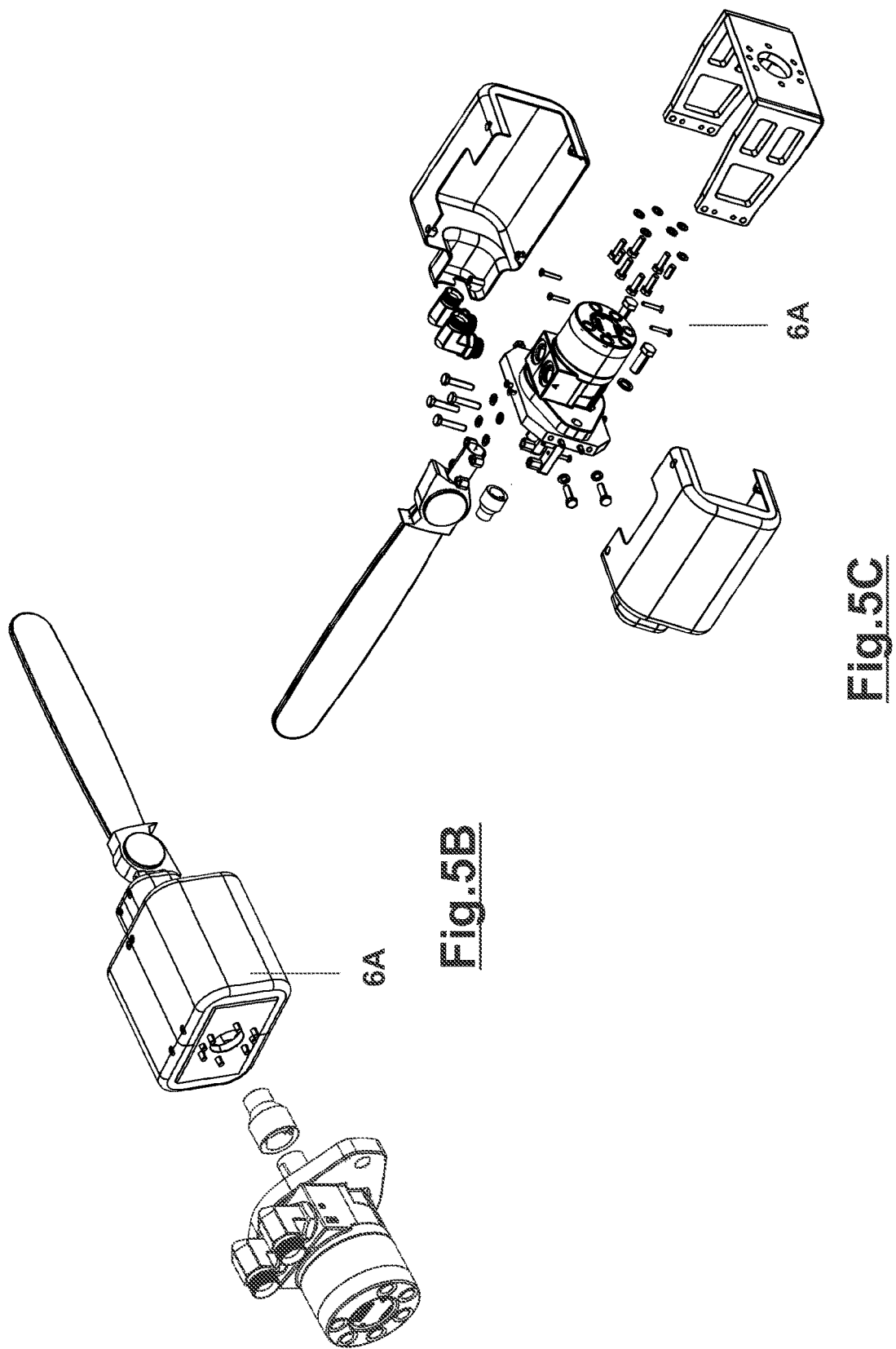

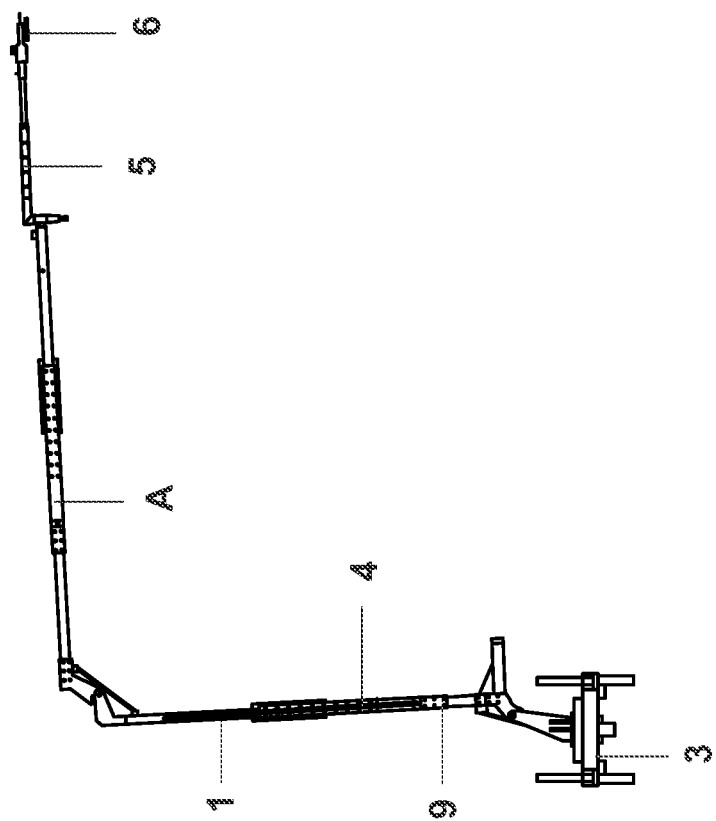
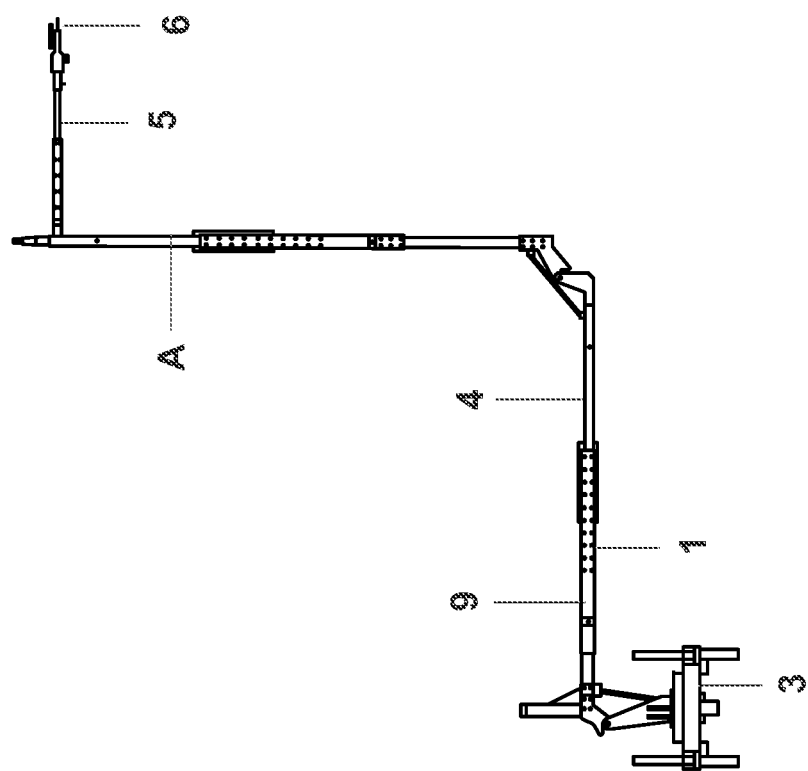

REMOTE-CONTROLLED ROBOTIC EQUIPMENT FOR TREE PRUNING NEAR ENERGIZED POWER LINES

FILED OF THE INVENTION

The present invention is in the field of equipments for pruning trees.

BACKGROUND OF THE INVENTION

Currently, maintenance in electric power distribution networks may be carried out in medium or low voltage networks, on energized or non-energized lines, being the later a more recommended procedure, because all maintenance activities in the power sector must give priority to services with non-energized power lines, and power lines are considered to be non-energized when cleared for service based on appropriate protocols. It is important to highlight that services with non-energized power lines also requires safety procedures and measures to be in place, pursuant to regulations or recommendations, and the adoption of the necessary procedures, methodologies and tools for each one of the situations described.

Until some time ago, maintenance on non-energized power lines was considered safe by electricians; however, because of the increased number of circuits and more complex distribution networks, as well as incidents and fatal accidents, deenergizing lines was no longer safe enough, especially due to the risk of accidental energization.

Pursuant to NR-18 Regulation, when it is not possible to turn off the electric circuit, services performed in energized power lines is only possible once additional protection measures have been implemented, being mandatory to use appropriate tools and personal protective equipment as set forth in NR-10 Regulation, which are adequate to each voltage range, in addition to implementing procedures and methodologies to ensure workers safety.

Tree pruning means removing certain parts of the plant to avoid interference with BT or MT/AT networks, thus avoiding short circuit among conductors. Tree pruning may be carried out for several reasons, including to maintain or improve tree health, and to ensure the safety and reliability of power systems and people. However, when tree pruning is carried out by electric power companies, operators should not only prune specific parts of the tree that may jeopardize the integrity of distribution lines, but also ensure the tree will not lose its stability and eventually fall down or die.

Managing city plants and trees, including planning, planting, maintaining and preserving trees, is under the responsibility of the local government. Nevertheless, electric power companies must prune trees whenever the operation of electric power distribution networks is threatened. This task should be performed by a pruner specialized in power networks, who is duly trained to handle trees and plants near electric power lines.

It is important to highlight that trees located near electrical conductors in different points of electric power distribution networks are the major cause of aerial electric power distribution network failure, i.e. broken electrical conductors, light poles falling down, fatigue of accessories, and power failure. Increased tree pruning leads to fewer interruptions in the electric power distribution system. The cost of tree pruning, to ensure reliability of electric power distribution networks, represents a great part of the total costs incurred annually by power companies with network servicing.

Furthermore, tree pruning has several risks, it is a dangerous task, especially to power company operators or their service providers working around aerial power lines in general, including working at height, risk of electric shock, risk of falls, accidents involving pruning tools, and insect attacks. This high risk profile for workers encourages the constant development and design of devices that can make such tasks safer and more comfortable.

According to the technical procedures adopted by power companies, tree pruning near multiplexed power lines, either of primary or secondary voltage, is only justified if tree branches or the tree itself is causing mechanical problems to the conductors. This is because in multiplexed networks, conductors can be touched by tree branches nearby. For compact distribution networks, the same precautions must be taken and the same safety distance from the network must be kept, as these networks are protected only, but not isolated.

Currently, tree pruning is carried out by power companies or their service providers as follows: branches located below conductors and which are invading the minimum safety distance from high voltage primary networks, either conventional or compact ones, are removed. This is carried out by non-energized line operators who generally use mechanical tools or combustion chainsaws, and truck-mounted ladders or regular ladders; branches growing from bottom to top towards the network must be pruned provided that they are not touching the conductors. This is carried out by non-energized line operators who generally use mechanical tools or combustion chainsaws, and truck-mounted ladders or regular ladders; branches located over the primary network and touching conductors can only be pruned if the line has been deenergized, tested, grounded and tagged out, or by energized line operators who are trained to perform this kind of service and who use all necessary PPE and CPE.

Some steps have to be taken during tree pruning near electric power distribution networks: preliminary procedures; tree pruning; and subsequent procedures. Additionally, other procedures are necessary in specific situations or when using shredders and truck-mounted containers.

Currently, tree pruning procedures widely known by the current state of the art are based on manual hydraulic-type or combustion-type pruning tools, which must have electrical isolation to avoid risks to electricians. The tools used include: hand pruners for smaller branches; pole pruners (variable length) activated by a rope for high branches; manual saws for thicker branches with the following main characteristics: blade angle, number of teeth, rigidity, blade profiling, and cutting direction; and fixed-support chainsaws adapted to tree pruning in city environments with the following main characteristics: cutting heads, type of activation, and pole. For larger branches, the chainsaw must be supported by a specific auxiliary rope.

In this context, robotics can be applied successfully to the power sector. In fact, robots have been used to replace human labour in some and repetitive tasks, which pose a risk to operator safety due to the inherent characteristics of the process, or tasks that must be carried out in dangerous locations. Therefore, the power sector has a wide range of elements where robotics can be used, including electric power network maintenance or inspection, and, more specifically, it may help to significantly increase productivity and offer a safe environment for task execution.

Other factors that foster the use of robotics in power systems include cost reduction, as fewer specialized operators are used in the task, and task reproducibility assurance when robotic devices are automated.

Due to the risks associated with tree pruning and the importance of this activity for the good operation of aerial distribution networks, power companies, especially their service providers working with tree pruning near conductors in electric power distribution networks, urgently need a versatile, convenient, safe and precise piece of equipment to streamline tree pruning tasks near conductors to be carried out by power companies themselves or their service providers.

In an extensive literature review, conducted to define the current state of the art regarding tree pruning equipment near energized inner-cities, object of this invention, no relevant documents to the state of the art were found that relate to the specific equipment claimed in this invention, i.e. proper solutions for tree pruning near energized inner-cities, more specifically, a robotic equipment remote-controlled by an operator for tree pruning near energized inner-cities based on an isolated teleoperated mechanical arm containing tools adapted as end effectors, integrated to shredding devices and a collection bin for the tree branches removed after pruning.

Therefore, this patent gathers components and processes in a distinguished invention, which will meet the different demands of the task, i.e. tree pruning and branch shredding near energized power lines in urban areas. This invention will offer a remote-controlled robotic equipment which is highly efficient, functional, resistant, durable, safe, versatile, precise, and ergonomic in the light of its excellent technical features, and which will offer advantages and improve tree pruning procedures near conductors in electric power lines performed by power company operators or service providers, and whose general characteristics are different from other forms and models known by the current state of the art.

What is needed therefore, is an equipment intended for use in electric power distribution networks in general, more specifically a remote-controlled robotic equipment for tree pruning near energized power lines whose basic principle, according to its general characteristics, is to provide a remote-controlled robotic equipment in its own, a specific electromechanical structure coupled to a truck and based on a robotic arm with a stand, a positioner, a handler and an end effector-pruning tool, a collection bin and a tree branch shredder, all of which are integrated, for robotized tree pruning near energized power lines, which can conveniently, safely and precisely streamline the procedures adopted in the maintenance of aerial electric power distribution networks, more specifically, tree pruning near urban electric power distribution networks, combined with full ergonomics and no exposure of operators to these routine procedures and based on a remote-controlled robotic equipment with great resistance, safety and versatility. Specifically designed and shaped, and easily accessible for better adaptation and safety for users, convenient handling and functionality due to its general characteristics and sizing, easily usable in a wide range of tree pruning situations involving urban electric power lines, including power lines of any construction type in the field of engineering, both low, medium and high voltage networks, in general.

SUMMARY OF THE INVENTION

A remote-controlled robotic equipment for pruning trees which are located near energized power lines; having a specific electromechanical structure coupled to a truck and based on a robotic arm with a stand, a positioner, a handler and a pruning tool, a collection bin and a tree branch shredder, all integrated and working in synschrony. The equipment can safely and precisely streamline any procedures adopted and necessary in the maintenance of aerial electric power distribution networks, specially in urban envirionments. The equipment also provides for full ergonomics and no exposure of operators.

BRIEF DESCRIPTION OF THE DRAWINGS

FIG. 1B is a perspective view of the remote-controlled robotic equipment for tree pruning near energized power lines without the truck.

FIG. 3A is a front perspective view of the handler and end effector—saw of the remote-controlled robotic equipment for tree pruning near energized power lines.

FIG. 3B is a posterior perspective view of the handler and end effector—saw of the remote-controlled robotic equipment for tree pruning near energized power lines.

FIG. 3C is a front perspective view of the handler and end effector—claw+pole pruner of the remote-controlled robotic equipment for tree pruning near energized power lines.

FIG. 3D is a posterior perspective view of the handler and end effector—claw+pole pruner of the remote-controlled robotic equipment for tree pruning near energized power lines.

FIG. 4A is a posterior perspective view of the handler of the remote-controlled robotic equipment for tree pruning near energized power lines.

FIG. 4B is a front perspective view of the handler of the remote-controlled robotic equipment for tree pruning near energized power lines.

FIG. 4H is a front perspective view of the handler of the remote-controlled robotic equipment for tree pruning near energized power lines showing its possible movements.

FIG. 5A is a perspective view of one type of end effector—saw of the remote-controlled robotic equipment for tree pruning near energized power lines.

FIG. 5B is an exploded perspective view of one type of end effector—saw of the remote-controlled robotic equipment for tree pruning near energized power lines.

FIG. 5C is an exploded perspective view of one type of end effector—saw of the remote-controlled robotic equipment for tree pruning near energized power lines.

FIG. 7A is a schematic view of the remote-controlled robotic equipment for tree pruning near energized power lines showing its possible positions.

FIG. 7B is a schematic view of the remote-controlled robotic equipment for tree pruning near energized power lines showing its possible positions.

DETAILED DESCRIPTION OF THE INVENTION

Figure 1A:
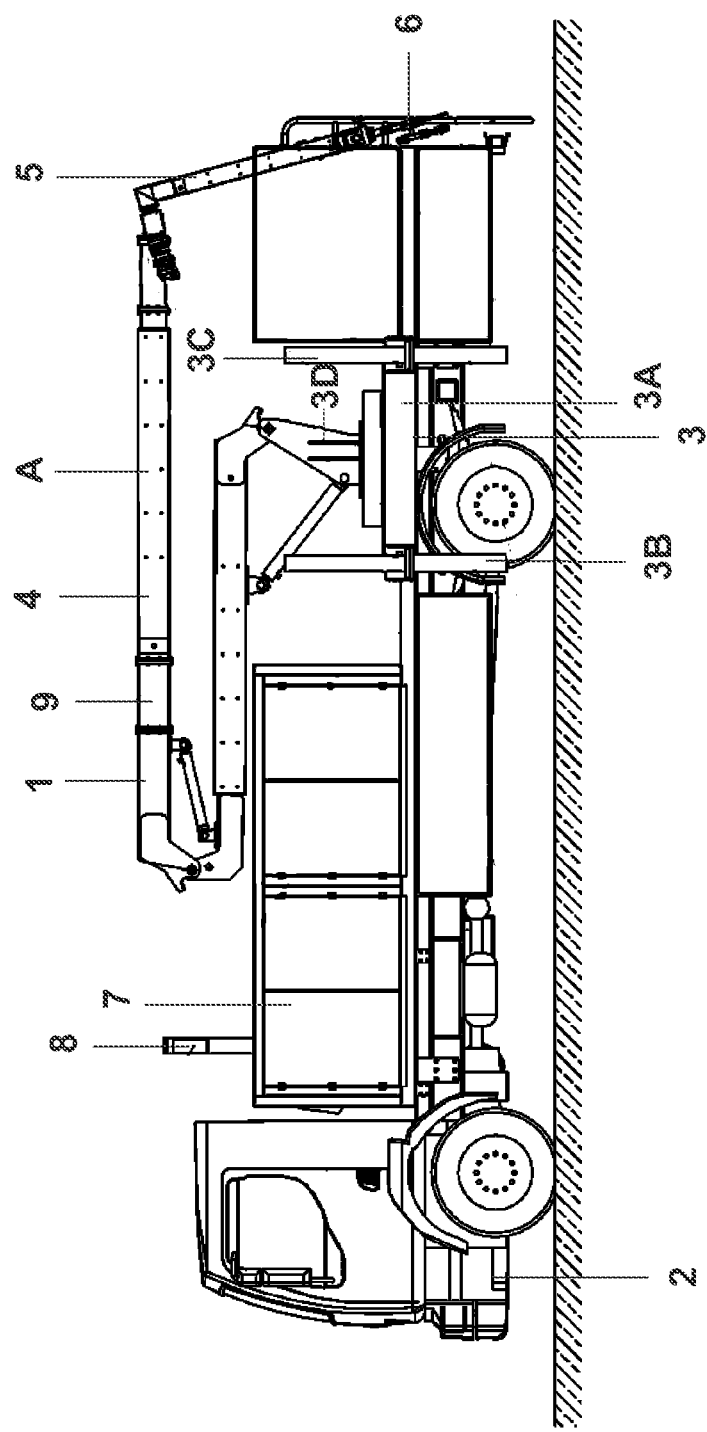
FIG. 1A is a side view of the remote-controlled robotic equipment for tree pruning near energized power lines.
Figure 2A:
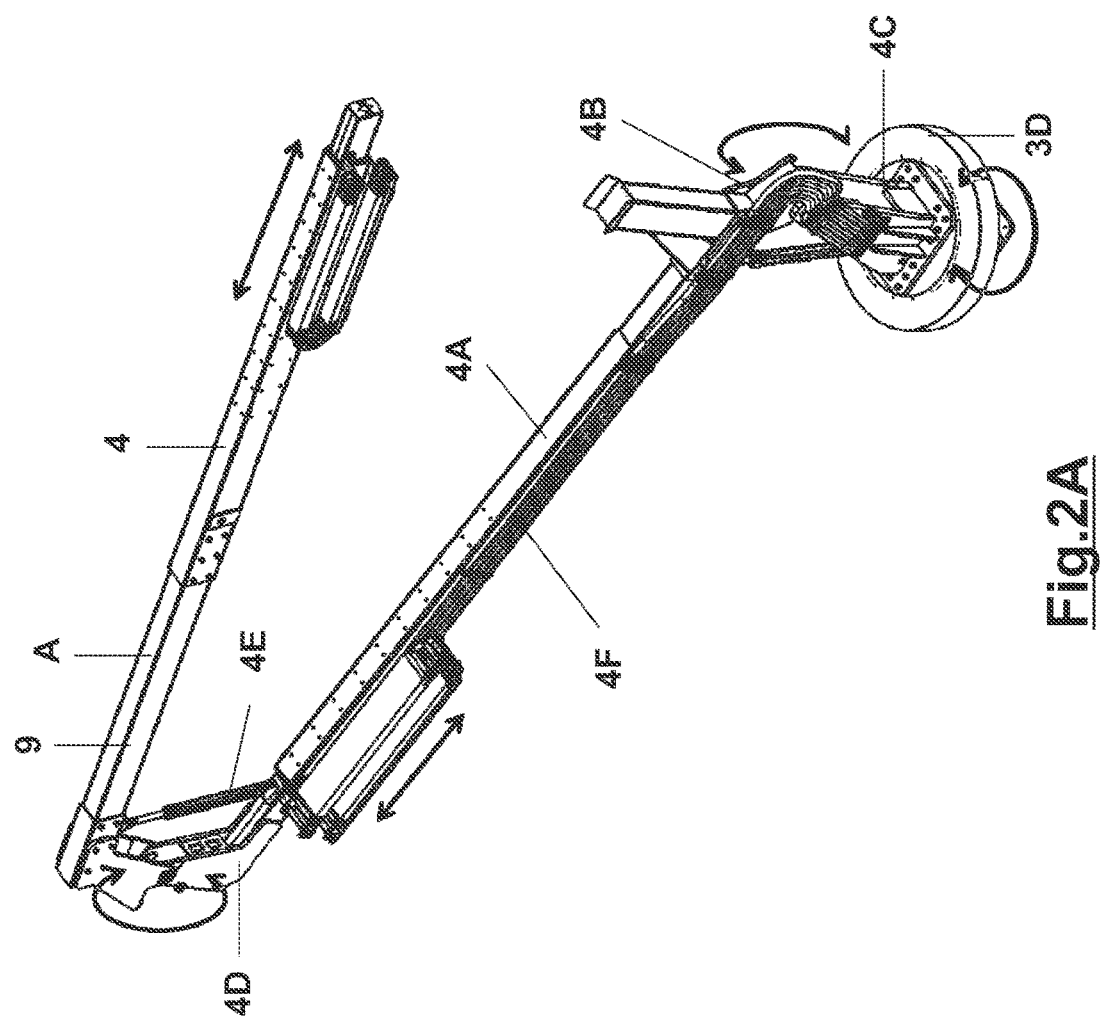
FIG. 2A is a perspective view of the stand and positioner of the remote-controlled robotic equipment for tree pruning near energized power lines showing their possible movements.
Figure 2B:
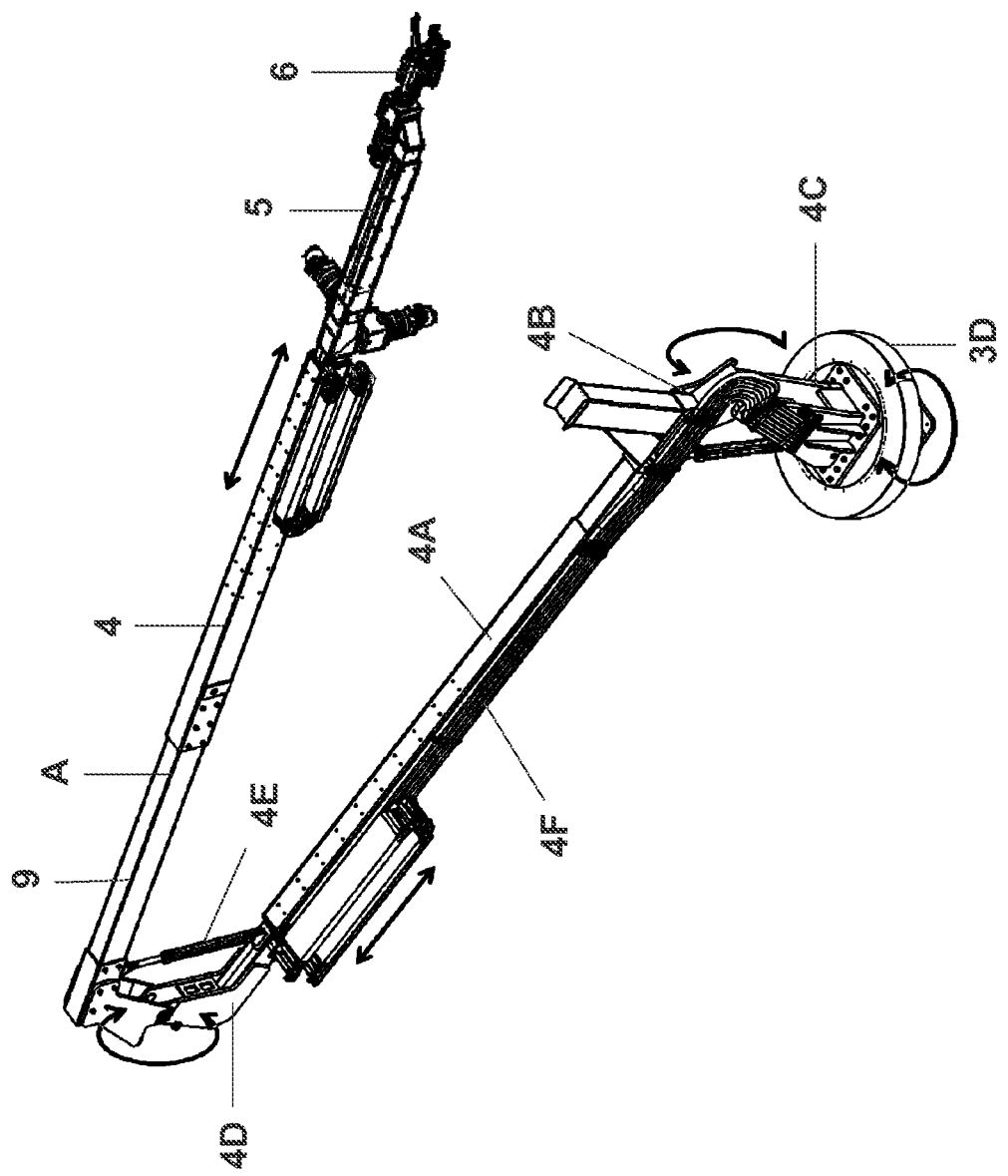
FIG. 2B is a perspective view of the stand, robotic arm-positioner and handler, and end effector of the remote-controlled robotic equipment for tree pruning near energized power lines.
Figure 4E:
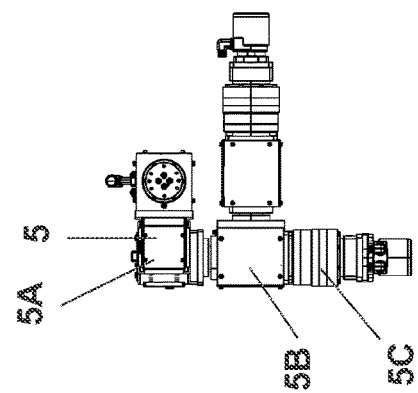
FIG. 4E is a front view of the handler of the remote-controlled robotic equipment for tree pruning near energized power lines.
Figure 4D:
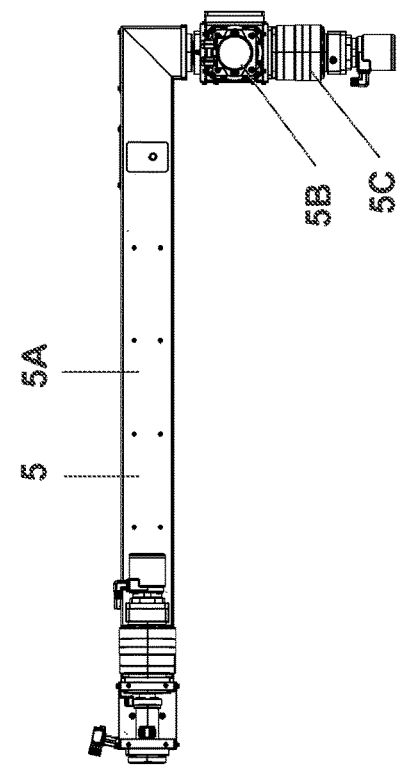
FIG. 4D is a side view of the handler of the remote-controlled robotic equipment for tree pruning near energized power lines.
Figure 4C:
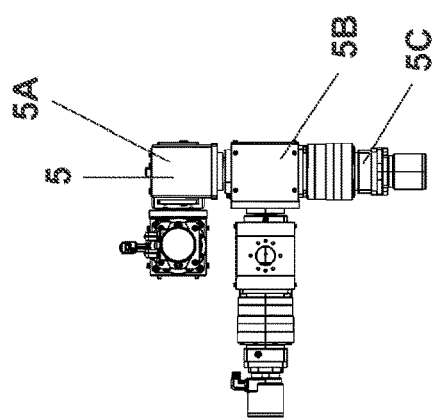
FIG. 4C is a posterior view of the handler of the remote-controlled robotic equipment for tree pruning near energized power lines.
Figure 4F:
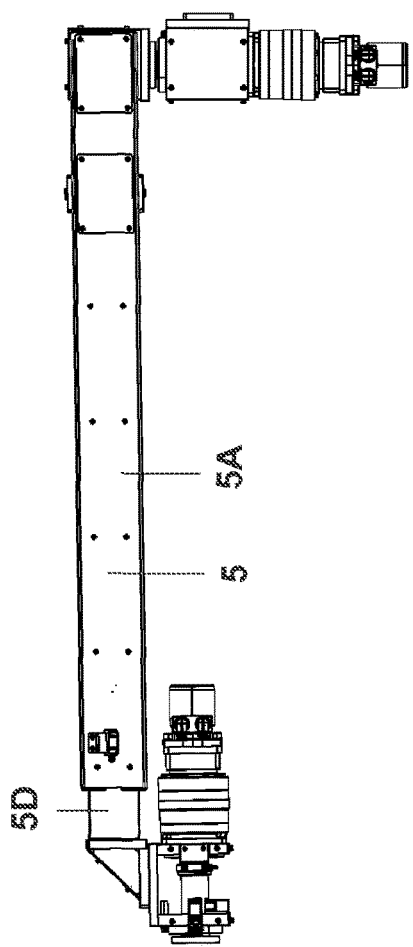
FIG. 4F is a top view of the handler of the remote-controlled robotic equipment for tree pruning near energized power lines.
Figure 4G:
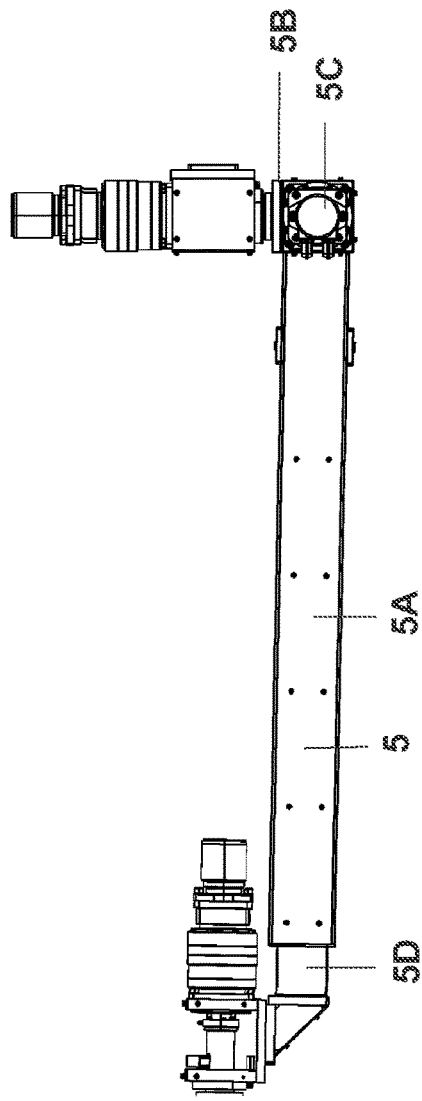
FIG. 4G is a bottom view of the handler of the remote-controlled robotic equipment for tree pruning near energized power lines.
Figure 6B:
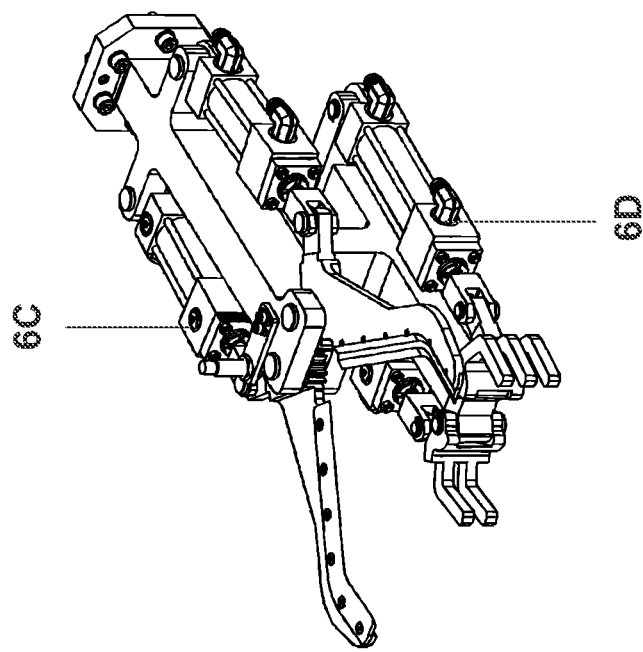
FIG. 6B is a front view of one type of end effector—claw+pole pruner of the remote-controlled robotic equipment for tree pruning near energized power lines.
Figure 6A:
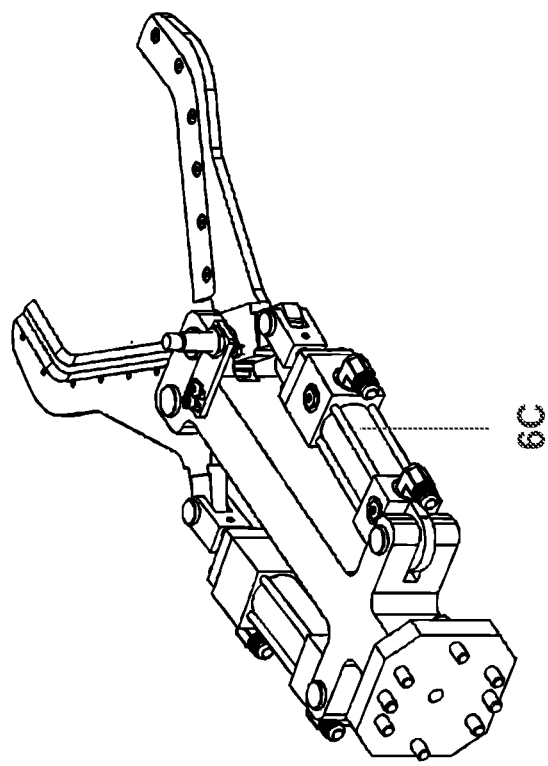
FIG. 6A is a posterior view of one type of end effector—pole pruner of the remote-controlled robotic equipment for tree pruning near energized power lines.
Figure 7D:
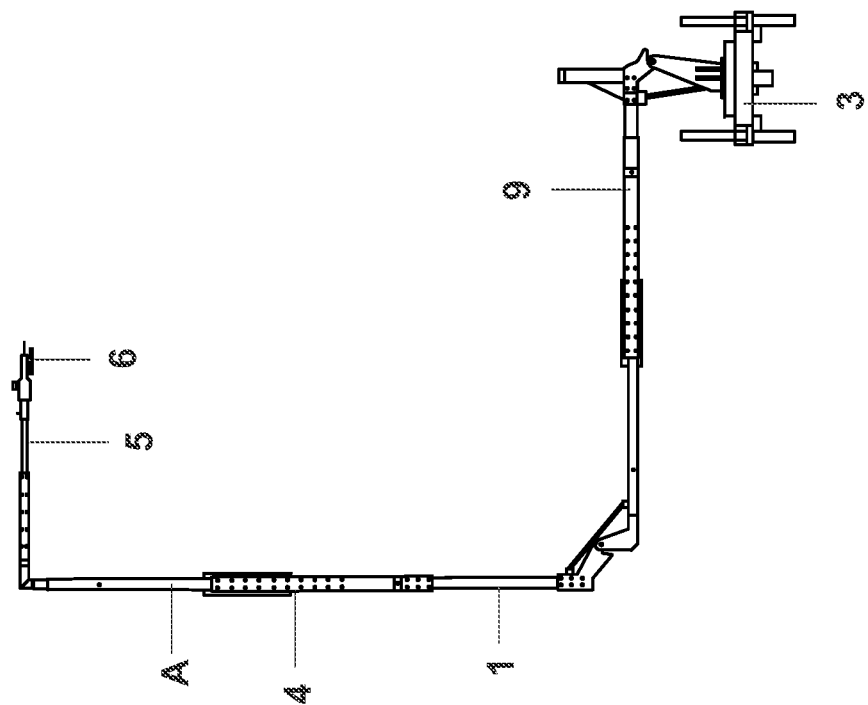
FIG. 7D is a schematic view of the remote-controlled robotic equipment for tree pruning near energized power lines showing its possible positions.
Figure 7C:
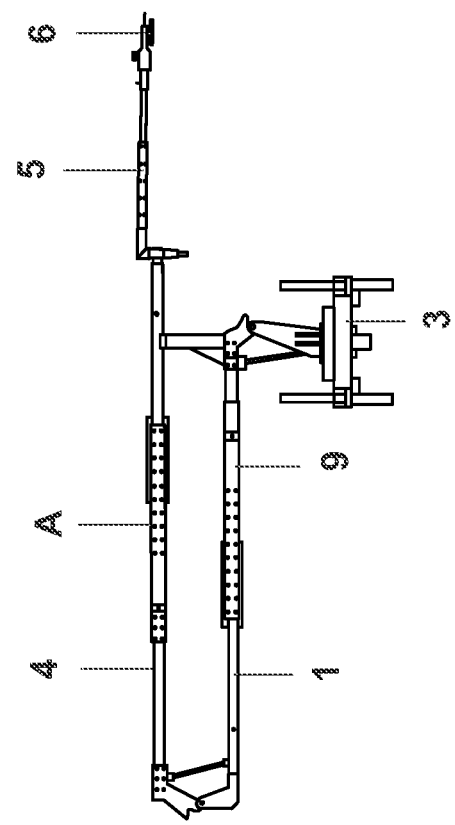
FIG. 7C is a schematic view of the remote-controlled robotic equipment for tree pruning near energized power lines showing its possible positions.

This invention relates to the use of a modern, efficient, safe, and functional remote-controlled robotic equipment for tree pruning near energized power lines, which includes electrical and mechanical solutions properly incorporated, constituting a complete and distinguished remote-controlled robotic equipment with exclusive design, great finishing details, good aesthetics and its own characteristics, with its own and specific electromechanical structure, high durability, electrical isolation, and mechanical strength, containing a truck to structure and move the remote-controlled robotic equipment set, a stand to support the robotic arm-positioner, handler and end effector (tool), a positioner to reach the handler on trees, a handler to activate the end effector, an end effector to prune trees, a collection bin to collect tree branches, and a shredder to shred branches in the collection bin, which are perfectly integrated to one another, as to form a unique, complete and safe set, whose shape, and inner and outer arrangements enable great adaptation to a wide range of electric power distribution networks in general, being especially designed for such purposes.

The remote-controlled robotic equipment for tree pruning near energized power lines of the present invention is totally based on the fact it is simply and robustly structured with the least number of components possible, with an extremely simple, safe, and streamlined operation, combined with quite convenient manufacturing and maintenance procedures, as to create a convenient and effective remote-controlled robotic equipment on a robotic arm with a positioner, which consists of two booms with three rotating shafts and two linear displacement shafts, and a handler coupled to the end of the positioner, and consisting of a boom with four degrees of freedom, with three rotating shafts and one linear displacement shaft, as to enable quick coupling of two pruning tools at its end: saw (rotation cutting) and pole pruner (pressure cutting) and, in addition to the pole pruner, it is possible to use a claw to avoid that tree branches fall down.

It is important to highlight this remote-controlled robotic equipment is fully activated by a hydraulic system, joints are driven by hydraulic motors or pistons, class "C" electrical isolation is present throughout the equipment, and robotic arm communication occurs through optical fiber. The equipment is controlled by a wireless man-machine interface, and teleoperated remotely from the ground, thus providing safety and ease of use to operators.

This remote-controlled robotic equipment is based on the application of components and processes in a distinguished design, without, however, being too sophisticated and complex, being able to solve some of the main problems found in other forms and models widely known by the current state of the art and used to prune trees near energized power lines, where difficulties to use and apply the equipment, poor effectiveness and performance, and accidents are very frequent, and the forms and/or models are either based on simple adaptations, being, therefore, unsafe, easily deteriorated, fragile, highly imprecise, difficult to operate, little durable, little versatile, high loss rate, low yielding, and poor performance, or are too big, expensive, have large volume and weight, little flexibility, complex handling, increased maintenance, waste time, have high loss rate, and complex manufacturing.

FIG. 1A) shows an overview of the invention, consisting of a complete remote-controlled robotic equipment (1) with its own characteristics, which incorporates its own and specific electromechanical structure that is highly durable and resistant, whose shape, and inner and outer arrangements adapt to a wide range of electric power distribution networks in general, and which contains a truck (2) symmetrically arranged along the entire length of the remote-controlled robotic equipment (1), whose main function is to structure and move the remote-controlled robotic equipment set (1); a block-shaped stand (3) arranged vertically, perpendicularly and symmetrically over the truck trailer (2) having a basis arranged horizontally, parallel to and symmetrically over the truck chassis (2), hydraulic jaws (3B) arranged vertically, perpendicularly and symmetrically on the lateral ends of the base (3A) acting as stabilizers of the set when in operation, hydraulic actuators (3C) arranged vertically and symmetrically adjacent to each one of the hydraulic jaws (3A) whose main function is to stabilize and anchor the truck (2), and a gearing tower (3D), arranged vertically and symmetrically centered over the base (3A) whose main function is to support the robotic arm (A)—positioner (4), handler (5) and end effector (6) (tool); one rectilinear, rectangular cross-sectional positioner (4), arranged perpendicularly and symmetrically centered on the upper support end (3) and containing two telescopic booms (4A) in three rotating shafts and two linear displacement shafts—three rotary joints (4B) driven by hydraulic motors (4C) and two prismatic joints (4D) driven by hydraulic pistons (4A), and one hydraulic system (4F) that feeds and loops to each positioner actuator (4) and that feeds the handler hydraulics (5), whose main function is to position the handler (5) near the tree; a rectilinear, rectangular cross-sectional handler (5) aligned with and symmetrically centered on the upper end of the positioner (4) and containing a telescopic boom (5A) in four degrees of freedom—three rotating shafts and one linear displacement shaft—three rotary joints (5B) driven by hydraulic motors (5C) and one prismatic joint (5D) driven by hydraulic pistons, rotary-rotary-prismatic-rotary—RRPR kinematic structure, whose main function is to activate the end effector (6); a block-shaped end effector (tool) (6) aligned with and symmetrically centered on the upper end of the handler (5), and containing a quick coupling (6A) arranged symmetrically on its posterior end—the interconnection end of the handler (5) and end effector (6), whose main function is to prune trees with omnidirectional cutting (all sides); a collection bin (7) arranged vertically, perpendicularly and symmetrically over the truck trailer (2), whose main function is to collect branches removed from the tree after shredding; a shredder (8) arranged vertically, perpendicularly and symmetrically over the truck trailer (2), whose main function is to shred branches; electrical isolation (9), class C, by means of two electrical isolators, pursuant to ABNT NBR 16092 regulation, both in the positioner (4) and the handler (5), whose main function is to isolate the remote-controlled robotic equipment (1); one set of optical fiber for communication, whose main function is to provide communication between the components of the remote-controlled robotic equipment (1); incremental or absolute encoders, whose main function is to identify the actual position of each robotic arm joint (A); a two-system set control—a master system with embedded firmware for kinematic calculation, automatic routines and safety systems, and a slave system for handler (5) control and feedback signal conditioning; and a man-machine interface—a wireless MIMI interconnected to the set control and to the robotic arm (A), whose main function is to teleoperate the remote-controlled robotic equipment (1) remotely from the ground—controlled and assisted by a man-machine interface—MMI; and, considering the handler (5) and the positioner (4) are activated individually, and on a joint-to-joint manner or through a xyz Cartesian system driven by a hydraulic system of motors or hydraulic pistons.

The remote-controlled robotic equipment for tree pruning near energized power lines, according to application needs, may consist of a camera arranged perpendicularly and symmetrically on the upper end of the handler (5), in addition to all of the other characteristics inherent to the remote-controlled robotic equipment (1).

The remote-controlled robotic equipment for tree pruning near energized power lines, according to application needs, may consist of a saw (6B) (rotation cutting), a pole pruner (6C) (pressure cutting) and a removable attached claw (6D) (pressure sustained), in addition to all of the other characteristics inherent to the remote-controlled robotic equipment (1).

The positioner (4) is activated in order to enable the handler (5) to reach the tree and cut the branches, i.e. less will be demanded from it than the handler (5)—it will be activated few times when compared to the handler (5). The operation will be carried out visually by the operator and its joint-to-joint activation mode avoids innumerous undesirable situations during pruning when compared to the xyz Cartesian activation mode, which requires three commands, as it implicates in all joints moving simultaneously, while the joint-to-joint activation mode simplifies the operation, thus ensuring set movement predictability, i.e., the joint-to-joint activation mode avoids that the positioner (4) and handler (5) collide with power lines, poles or trees, and avoids the complexity involved in viewing/understanding all movements made by the robotic arm (A) to reach the xyz position.

The handler (5), through its rotary-rotary-prismatic-rotary—RRPR kinematic structure, has the first shaft rotating upwards and the second rotating sidewards, i.e., the first handler (5) shaft, although having a shaft rotation towards the same direction as the shaft in the last two rotary joints of the positioner (4), is important to adjust this angle after passing through the conductors; and the second rotating shaft is used move away from the plane defined by the first rotary joint of the positioner (4).

The prismatic joints in the remote-controlled robotic equipment (1) are highly important for robotic arm (A) use, as they facilitate control by the operator and enable access to restricted areas, including access with the positioner (4) among medium and low voltage networks.

The inclusion of prismatic joints enables the handler (5) to move parallel to energized lines, simplifying some repositioning maneuvers. When inserting one prismatic joint to the handler (5) and two to the positioner (4), the three rotary joints of the handler (5) offer satisfactory range.

Electrical isolation by means of a lower isolator (chassis isolation) is intended to provide additional protection to operators, as the area between the robotic arm (A) and the upper isolator may inadvertently touch an energized conducted in the primary or secondary network.

The remote-controlled robotic equipment (1) is based on a real-time monitoring and control system based on a man-machine interface—MMI which ensures proper electrical isolation between the handler (5) near the energized power line and the truck (2), being hydraulic control system integration carried out through modules, with communication between isolated points of the robotic arm (A) and a network module with optical fiber converter.

The control of the set ensures handler (5) activation and, together with optical fiber signal conditioning, class C electrical isolation is also ensured. These signals, conditioned by the signal accumulator in the isolated part of the robotic arm (A), make it possible to control the handler (5) hydraulic valves near the accumulator and also to determine the actual joint-to-joint position through encoders.

The pole pruner (6C) cuts smaller branches by using two cutting stages: the first stage will apply the maximum pressure limit on actuators, ensuring the integrity of the cutting end effector (tool) (6) in case branches offer excessive resistance; the second stage will apply nominal system pressure on actuators for cutting, where the momentum applied to the end effector (tool) (6) will not damage it.

The claw set (6D) with the pole pruner (6C) will cut branches at higher risk of falling down. Therefore, the operator will be able to hold the branch to be pruned, observing the necessary procedures so that the branch does not exert a load that is higher than the system limit.

The remote-controlled robotic equipment for tree pruning near energized power lines, for having components that are fully integrated to one another, can be assembled and disassembled quickly, no parts are decoupled and no parts become subject to breaking or twisting. A high degree of performance and effectiveness is achieved, combined with high durability and perfect safety. Once fully integrated to one another, components are firmly and closely tied, thus preventing their accidental release when in use. The set is fully available for maintenance procedures in energized power distribution networks, more specifically for pruning a wide range of trees located adjacent to different types of conductors in energized power distribution networks in urban environments. Therefore, the remote-controlled robotic equipment (1) can be used without concerns of any kind, especially regarding durability and component safety, as well as safety of power company operators.

In view of the foregoing, this invention relates to an electromechanical equipment to be shown to power companies and service providers and, for being a remote-controlled robotic equipment for tree pruning near energized power lines, it has innumerous advantages, including: great safety, reliability and ease-of-use; great yielding and performance due to its general design; great comfort, convenience and safety for users; great resistance and general durability, combined to little or no wear of the set as a whole; totally affordable with great cost-effectiveness; can be used in a convenient and safe way by power companies or service providers; great range; low and easy general maintenance; perfect and direct adaptation to several types of trees and electrical conductors; high operational precision; great mobility and flexibility; highly ergonomic; easy to exchange pruning tools—end effector (tool) (6); based on an environmentally-friendly concept; and assurance of a remote-controlled robotic equipment that fully meets the current laws and regulations, and basic conditions necessary to its application.

All such attributes classify the equipment as a remote-controlled robotic equipment for tree pruning near energized power lines, which is operated in a fully versatile, effective, convenient and safe fashion, streamlining maintenance procedures in aerial power lines and, more specifically, pruning different types of trees located near electrical conductors in city electric power distribution networks, in several locations, and by a wide range of operators working in power companies, regardless of the general characteristics these might have, being easy to use and handle, combined with great performance and excellent general characteristics; nevertheless, sizing, dimensions and amounts may vary according to the needs of each application.

The invention claimed is:

1. A remote-controlled robotic equipment for tree pruning near energized power lines, said robotic equipment comprising:
    a stand and a truck trailer, wherein the stand is arranged along the rear of the truck trailer:
    a base arranged over the truck trailer, including hydraulic jaws arranged on the lateral ends of the base, hydraulic actuators to stabilize and anchor the truck trailer arranged adjacent to the hydraulic jaws, and a gearing tower arranged over the base, said base comprising a rectilinear positioning rod arranged on the gearing tower and two telescopic booms each with three rotating shafts driven by hydraulic motors and two prismatic joints driven by hydraulic pistons and one hydraulic feeding system;
    a rectilinear drive rod arranged on the rectilinear positioning rod and comprising a telescopic boom with three rotating joints driven by hydraulic motors and one prismatic joint driven by hydraulic pistons, a block-shaped end effector arranged on the rectilinear drive rod and containing a coupling arranged on the end effector, and a saw or a pole pruner or a pressure claw arranged on the coupling;
    a collection bin arranged over the truck trailer;
    a shredder arranged over the truck trailer;
    a set of optical fibers for communication between components of said remote-controlled robotic equipment;
    encoders to identify the actual position of the rectilinear positioning rod and the rectilinear drive rod; and
    a remote control to control the remote-controlled robotic equipment by a man-machine interface.

2. The remote-controlled robotic equipment for tree pruning near energized power lines according to claim 1, further comprising a camera arranged on the rectilinear drive rod.

* * * * *